United States Patent Office 3,557,260
Patented Jan. 19, 1971

3,557,260
METHOD OF PREPARING PHOSPHATE ESTERS USING METAL SULFATE CATALYSTS
Arthur E. Gurgiolo, Lake Jackson, Tex., assignor to The Dow Chemical Company, Midland, Mich., a corporation of Delaware
No Drawing. Filed May 2, 1967, Ser. No. 635,343
Int. Cl. C07f 9/08, 9/16
U.S. Cl. 260—977
13 Claims

ABSTRACT OF THE DISCLOSURE

Haloalkyl phosphate and phosphite esters are prepared by reacting an epoxide with a phosphorus oxyhalide or halo phosphite with an epoxide in the presence of small amounts of free water or up to 18 moles of water of crystallization present in a sulfate of a di-, tri-, or tetravalent metal having an atomic number from 12–82, inclusive. The tris(haloalkyl) phosphate and phosphite esters have known utility as fire-retardant plasticizers for vinyl and cellulose ester polymers.

---

This invention relates to a method of making phosphorus and phosphoric haloalkyl esters by reacting a compound of the formula $P(O)_{0-1}X_3$ where X is a halogen atom, with a vicinal epoxide in the presence of from about .05 to about 5% by weight based on the phosphorus compound of a sulfate of a di-, tri- or tetravalent metal of atomic number 12–82, inclusive, and small amount of free water or up to about 18 moles of water of crystallization as the catalyst.

The known processes for preparing haloalkyl phosphate and phosphite esters by reacting $POX_3$ or $PX_3$, where X is a halogen, with an epoxide are conducted under anhydrous conditions with water-sensitive metal halides. The presence of moisture is deleterious because it can hydrolyze some of the catalyst or the phosphorus-containing halide reactant. In many instances the use of metal halide catalysts also accelerates the formation of by-products if the temperature at which the reacion is run is raised to about 70–80° C. or higher, and in certain other instances it is necessary to wash the catalyst and by-products from the reaction mixture in order to obtain esters of low acid number.

I have found that the esterification of compounds of the formula $P(O)_{0-1}X_3$ with epoxides can be catalyzed with sulfates of metals of atomic number 12–82, inclusive, if traces of free water or up to 18 moles of water of crystallization per mole of catalyst are included in the system. In the absence of trace amounts of free water or water of crystallization, the sulfates displayed substantially no catalytic activity. One run made with a mole of $POCl_3$, 3.3 moles of ethylene oxide and 1% by weight baset on the weight of $POCl_3$ of anhydrous $Ti(SO_4)_2$ resulted in the production of a light brown product with an unsatisfactory acid number.

The amount of free water added to the system can range from 500 p.p.m. to about 1.0% based on the weight of catalyst. However, if the catalyst contains water of crystallization, no free water need be added, and preferably should be avoided. Most of the sulfates of the di-, tri- and tetravalent metals of atomic number 12 to 82, inclusive, have the additional advantage in that they are are not hygroscopic and therefore do not require special storage and handling. Mose of these catalysts produce light colored, low acid number phosphate and phosphite esters with a minimum of by-products at temperatures as high as 130° C. Further, most of the catalysts of this invention are substantially insoluble in the reaction mixture, so that filtration removes the catalyst from the mixture after the reaction is completed.

Representative catalysts are $TiOSO_4$, $Ti(SO_4)_2 \cdot 9H_2O$, $MgSO_4 \cdot 7H_2O$, $Cr_2(SO_4)_3 \cdot XH_2O$, $CrK(SO_4)_2 \cdot 12H_2O$, $Ce(SO_4)_2$, $MnSO_4 \cdot H_2O$, $ZnSO_4 \cdot 4H_2O$, $ZnSO_4$, $SnSO_4$, $PbSO_4$, $HgSO_4$, $CaSO_4 \cdot 2H_2O$ and $Al_2(SO_4)_3$.

Although amounts of catalyst, based on the phosphorus halide, can range from about .05 to about 5% by weight, the preferred amount is .5 to about 1% by weight. Below 0.1% catalyst, the reaction tends to slow down slightly and there appears to be no practical further increase in reaction rate at concentrations much above 1% by weight.

The reaction will proceed at temperatures of 25 to 130° C. At the low temperature, the reaction is fairly slow and above 130° C. there is a tendency with some of the catalysts to cause color formation. Therefore, the preferred reaction temperature is from about 60 to 120° C.

The reactants of the generic formula $P(O)_{0-1}X_3$ can be $POF_3$, $POCl_3$, $POBr_3$, $POI_3$, $PF_3$, $PCl_3$, $PBr_3$, $PI_3$ or the phosphorus atom can bear two or three different halogen atoms. Mixtures of the phosphorus halogen containing compounds can be used.

The epoxides which can be reacted with the phosphorus halogen-containing compounds have the generic formula

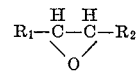

in which $R_1$ and $R_2$ each, independently, can be hydrogen, an alkyl group, a haloalkyl group, an allyloxyalkoxymethyl group, an allyloxy haloalkoxymethyl group, or an allyoxymethyl group. The total carbon content of the epoxide can range from 2 to about 57, and the $R_1$ and $R_2$ groups can contain carbon to carbon unsaturation.

Representative epoxides include, but are not limited to, ethylene oxide, 1,2-propylene oxide, 1,2-butylene oxide, 2,3-butylene oxide, 1,2-, or 2,3-pentylene oxide, 1,2-, or 2,3- and 3,4-n-hexylene oxide, styrene oxide, methylstyrene oxide, ring halogenated styrene oxides, allyl glycidyl ether, allyloxypropyl glycidyl ether, epichlorohydrin, epibromohydrin, epoxidized tall oil, epoxidized linseed oil, epoxidized cottonseed oil, or mono [glycidyl] ether of bisphenol A. Any epoxy compound containing up to abut 57 carbon atoms is operative.

The proportion of reactants should be at least 3 epoxy equivalents per mole of $P(O)_{0-1}X_3$ and preferably a slight excess of epoxy compound is used.

Typical catalysts are sulfates of Mg, Ca, Ba, Ti, Zr, V, Nb, Ta, Cr, Mo, W, Mn, Fe, Co, Ni, Cu, Zn, Cd, Re, Os, Al, Ge, Ga, Sn, Pb, and Sb. Sulfates of other metals having valents of 2–4, inclusive, and an atomic number of 12–82 are operable. The catalysts can be defined generically by the formula $M_x(SO_4)_y ZH_2O$, where M is a metal having a valence of 2 to 4 inclusive, and an atomic number of 12–82, $x$ is an integer of from 1 to 2, $y$ is an integer of from 1 to 3, and Z ranges from 500 parts per million based on the catalyst weight to 18 moles of water of crystallization. It should be understood that these metal sulfates do not have the same activity and that their efficiency varies. The preferred catalysts are the sulfates of Ti, Sn, Al and Zr.

The examples which follow are intended as illustrations of the invention, not as limitations. All parts are by weight unless otherwise specifically indicated.

EXAMPLE 1

A 500-ml. reactor equipped with a stirrer, thermometer, condenser, separator funnel and $N_2$ inlet was purged with nitrogen. Then, 66 parts by weight of $POCl_3$ and 1.5 weight parts of $TiOSO_4 \cdot 2H_2O$ were added to the flask and 95 weight parts of propylene oxide were fed to the $POCl_3$-catalyst mixture over a 30 minute period. The reaction was sufficiently exothermic to require some cooling to hold the temperature at 50–60° C. at the early stage of the reaction. During the addition of the final ⅓ of the propylene oxide the mixture was heated to 90° C. and held at 90°–108° C. for two hours. The mixture was allowed to cool to room temperature overnight. The unreacted materials were distilled at 90° C. and about 10 mm. pressure. The filtered tris(2 chloropropyl) phosphate was colorless and the acid number was less than 0.1. The yield, based on the $POCl_3$, was 92%.

EXAMPLE 2

A series of runs with $POCl_3$ and ethylene oxide was made by the procedural steps described in Example 1. The catalyst, its concentration, the molar ratios of reactants, the time and the temperature of reaction and the data obtained in these runs are listed in Table I.

TABLE I

| Run No. | Moles epoxide | $POCl_3$ Moles | Catalyst Type | Catalyst Weight Percent on $POCl_3$ | Reaction temp. °C. | Reaction time, hours | Weight of product | Acid No. of product |
|---|---|---|---|---|---|---|---|---|
| 1 | 3.64 | 1 | $TiOSO_4$ | .52 | 90 | 3 | 280 | .1 |
| 2 | 3.4 | 1 | Same | 4.9 | 50–55 | 18 | 265 | 49 |
| 3 | 4 | 1 | do | .98 | 60–90 | 4 | 286 | 0.3 |
| 4 | 4 | 1 | $Ti(SO_4)_2 \cdot 9H_2O$ | .98 | 60–90 | 2.5 | 276 | 0 |
| 5 | 3.87 | 1 | $TiO(SO_4)$ | .05 | 90 | 72 | 220 | 60 |
| 6 | 3.5 | 1 | $MgSO_4 \cdot 7H_2O$ | .98 | 90 | 2.5 | 257 | 2.6 |
| 7 | 3.4 | 1 | $SnSO_4$ | .52 | 85–90 | 2.5 | 290 | 1.0 |

None of the tris(chloroethyl) phosphate esters were washed after completion of the reaction.

The quantity of catalyst in run 5 was just sufficient to form a saturated solution in $POCl_3$ at 90° C.

In those cases where $TiOSO_4$ and $SnSO_4$ were used 500 p.p.m. of water based on catalyst weight were added to the catalyst before it was added to the $POCl_3$.

EXAMPLE 3

A series of runs was made by combining all ingredients at one time in a citrate bottle, flushing with nitrogen, capping the bottle and then holding at desired temperature levels for designated periods of time. Various epoxides and catalysts at several concentration levels were employed in the tests. Tabulated below are data for these runs.

TABLE II

| Run No. | Epoxide, moles | $POCl_3$, moles | Catalyst Type | Catalyst Weight percent on $POCl_3$ | Reaction temperature, °C. | Reaction time, hours | Weight of product, grams | Color of product |
|---|---|---|---|---|---|---|---|---|
| 1 | Propylene oxide, .86 | .25 | $Cr_2(SO_4)_3 \cdot H_2O$ | .52 | 70 | 30 | 85.5 | Colorless. |
| 2 | do | .25 | $CrK(SO_4)_2 \cdot 12H_2O$ | .52 | 70 | 30 | 83.8 | Tinge of green. |
| 3 | do | .25 | $Ce(SO_4)_2$ | .52 | 70 | 30 | 82.6 | Slightly yellow. |
| 4 | do | .25 | $MnSO_4 \cdot H_2O$ | .52 | 70 | 30 | 80.3 | Colorless. |
| 5 | do | .25 | $Zr(SO_4)_2 \cdot 4H_2O$ | .52 | 70 | 30 | 74.4 | Do. |
| 6 | do | .25 | $PbSO_4$[1] | .52 | 60 | 72 | 86 | Light yellow. |
| 7 | do | .25 | $ZnSO_4$[1] | .52 | 60 | 72 | 93 | Slightly dark. |
| 8 | Propylene oxide, 1.54 | .5 | $TiSO_4$[1] | .52 | 60 | 72 | 161.9 | Slightly yellow. |
| 9 | Epichlorohydrin, 1.62 | .5 | Same[1] | .52 | 60 | 72 | 221 | Do. |
| 10 | Epibromohydrin, .8 | .25 | do[1] | .52 | 60 | 72 | 157 | Slightly dark. |
| 11 | 2,3-butylene oxide, 1.46 | .5 | do[1] | .52 | 60 | 72 | 181 | Do. |
| 12 | Allyl glycidyl ether, 1.67 | .5 | do[1] | .52 | 60 | 72 | 260 | Slightly yellow. |
| 13 | Allyloxypropyl glycidyl ether, .76 | .25 | do[1] | .52 | 60 | 72 | 149 | Slightly dark. |
| 14 | Ethylene oxide, 1.7 | .5 | do[1] | .52 | 60 | 72 | 244 | Colorless. |
| 15 | do | .5 | do[1] | .52 | 60 | 72 | 244 | Slightly yellow. |
| 16 | do | .5 | do[1] | .52 | 60 | 72 | 243 | Do. |
| 17 | Ethylene oxide, .86 | .25 | $HgSO_4$[1] | .52 | 70 | 30 | 86 | Do. |
| 18 | do | .25 | $CaSO_4 \cdot 2H^2O$ | .52 | 70 | 30 | 74.4 | Do. |
| 19 | do | .25 | $(Al)_2(SO_4)_3$ | .52 | 70 | 30 | 87.6 | Colorless. |

[1] 500 p.p.m. water added with catalyst.

Run 14 was made with 100 ml. toluene, Run 15 with 100 ml. ethylene dichloride and Run 16 with 100 ml. dioxane, as diluents. The diluent in each instance was added to the $POCl_3$.

EXAMPLE 4

The equipment described in Example 1 was employed for reacting one mole of $PCl_3$ with 3.4 moles of ethylene oxide. To the $PCl_3$ was added .52 wt. percent of $TiOSO_4 \cdot 2H_2O$, and the ethylene oxide was added gradually over a period of about one hour and then reacted for an additional hour at 85–90° C. The reaction mixture was then cooled, filtered and flash distilled at 80° C. and 20 mm. pressure. The weight of light yellow tris(chloroethyl) phosphite recovered was 241 g. It had a refractive index of 1.4898 at 23° C. and an acid number of 4.3.

I claim:

1. The method which comprises commingling a phosphorus compound of the structure $P(O)_{0-1}X_3$ wherein X is a halogen with a vicinal epoxide of the formula

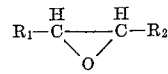

selected from the group consisting of ethylene oxide, propylene oxide, 1,2-butylene oxide, 2,3-butylene oxide, 2,3-pentylene oxide, 1,2-n-hexylene oxide, 2,3-n-hexylene oxide, 3,4-n-hexylene oxide, styrene oxide, epichlorohydrin, epibromohydrin, allyloxypropylglycidyl ether, and a monoglycidyl ether of bisphenol A, and a catalytic amount, up to about 5% by weight based on said phosphorus compound, of a sulfate of Al, Ca, Ti, Cr, Mn, Fe, Zn, Zr, Cd, Sn, Hg, Pb, and a double salt of Cr and an alkali metal, said reaction mixture containing from 500 p.p.m. to about 1% of free water based on the weight of the sulfate to about 18 moles of water of crystallization in said sulfate, the reaction temperature of said method ranging from about 60 to about 130° C.

2. The method of claim 1 in which one of $R_1$ and $R_2$ is hydrogen and the other is a hydrogen or a hydrocarbon group of from 1 to 2 carbon atoms.

3. The method of claim 1 in which the epoxide is ethylene oxide.

4. The method of claim 1 in which the epoxide is propylene oxide.

5. The method of claim 1 in which the epoxide is an epihalohydrin.

6. The method of claim 1 in which the epoxide is allyl glycidyl ether.

7. The method of claim 1 in which the epoxide is allyloxypropyl glycidyl ether.

8. The method of claim 1 in which the phosphorus compound is $POCl_3$.

9. The method of claim 1 in which the phosphorus compound is $PCl_3$.

10. The method of claim 1 in which the catalyst is $TiOSO_4$ in an amount ranging from about 0.1 to about 5% by weight based on the phosphorus compound.

11. The method of claim 10 in which the catalyst content ranges from about 0.1 to about 1%.

12. The method of claim 1 in which the catalyst is a double salt of Cr and an alkali metal.

13. The method of claim 1 in which the catalyst is $SnSO_4$.

References Cited

UNITED STATES PATENTS 1,936,985   11/1933   Lommel et al. ____ 260—977X

CHARLES B. PARKER, Primary Examiner

A. H. SUTTO, Assistant Examiner

U.S. Cl. X.R.

252—440; 260—30.6, 403, 950, 953, 963